(12) United States Patent
Wu et al.

(10) Patent No.: US 12,174,682 B2
(45) Date of Patent: Dec. 24, 2024

(54) ADAPTIVE NOISE SUPPRESSION FOR TOUCH SCREEN DISPLAYS

(71) Applicant: DELL PRODUCTS L.P., Round Rock, TX (US)

(72) Inventors: Chi-Che Wu, Taipei (TW); Wei-Cheng Yu, New Taipei (TW); Geroncio Ong Tan, Austin, TX (US); Tsung-Cheng Liao, Taoyuan (TW); Henry Chang, Xinzhuang District (TW)

(73) Assignee: Dell Products L.P., Round Rock, TX (US)

(*) Notice: Subject to any disclaimer, the term of this patent is extended or adjusted under 35 U.S.C. 154(b) by 32 days.

(21) Appl. No.: 18/165,166

(22) Filed: Feb. 6, 2023

(65) Prior Publication Data

US 2024/0264654 A1   Aug. 8, 2024

(51) Int. Cl.
  *G06F 3/041* (2006.01)
  *G06F 1/3218* (2019.01)
  *G06F 11/00* (2006.01)
  *G06F 11/07* (2006.01)

(52) U.S. Cl.
  CPC .......... *G06F 1/3218* (2013.01); *G06F 11/002* (2013.01); *G06F 11/0793* (2013.01)

(58) Field of Classification Search
  CPC . G05F 1/467; H01G 4/30; H01L 2224/48091; H01L 2224/48247; H01L 23/3107; H01L 23/3114; H01L 23/49524; H01L 23/49562; H01L 23/49575; H01L 23/49589; H01L 23/50; H01L 2924/00012; H01L 2924/00014; H01L 2924/181; H02M 1/327; H02M 3/003; H02M 3/158; H02M 3/1584
  See application file for complete search history.

(56) References Cited

U.S. PATENT DOCUMENTS

| | | | |
|---|---|---|---|
| 9,983,717 B2 | 5/2018 | Pacheco et al. | |
| 10,664,101 B2 | 5/2020 | Files et al. | |
| 10,802,518 B1 | 10/2020 | Luo et al. | |
| 2019/0129596 A1 | 5/2019 | Ligameri et al. | |
| 2019/0332154 A1* | 10/2019 | Thompson | G06F 1/3246 |
| 2020/0194735 A1* | 6/2020 | Nowalis | H01M 50/247 |

* cited by examiner

Primary Examiner — Insa Sadio
(74) Attorney, Agent, or Firm — Larson Newman, LLP

(57) ABSTRACT

An information handling system detects an initial insertion of an alternating current (AC) adapter, and determines an identifier associated with the AC adapter. The system may also determine a parameter for attenuating noise generated by the AC adapter based on the identifier, and attenuate the noise generated by the AC adapter by applying the parameter.

20 Claims, 3 Drawing Sheets

ADAPTIVE NOISE SUPPRESSION FOR TOUCH SCREEN DISPLAYS

FIELD OF THE DISCLOSURE

The present disclosure generally relates to information handling systems, and more particularly relates to adaptive noise suppression for touch screen displays.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system detects an initial insertion of an alternating current (AC) adapter, and determines an identifier associated with the AC adapter. The system may also determine a parameter for attenuating noise generated by the AC adapter based on the identifier, and attenuate the noise generated by the AC adapter by applying the parameter.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
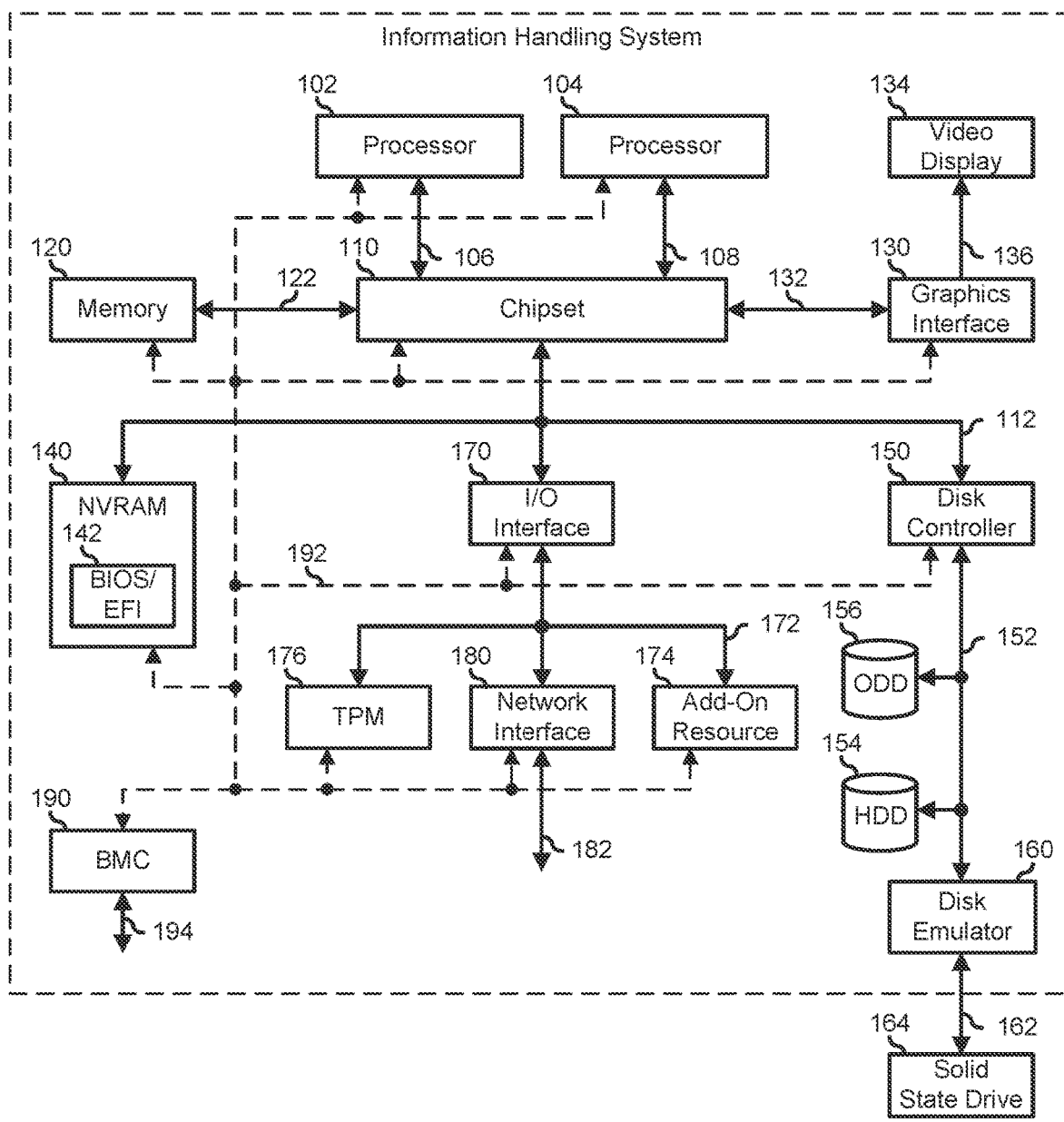
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a double data rate (DDR) memory channel and memory 120 represents one or more DDR dual in-line memory modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as dynamic random access memory (DRAM) DIMMs, static random access memory (SRAM) DIMMs, non-volatile DIMMs (NV-DIMMs), storage class memory devices, read-only memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell R Remote Access Controller (iDRAC).

Management interface 192 represents one or more out-of-band communication interfaces between BMC 190 and the elements of information handling system 100, and can include an Inter-Integrated Circuit ($I^2C$) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a RedfishR interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I$^2$C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Generally, information handling systems process end user inputs made at input devices, such as touch screen displays like video display 134 of FIG. 1, to create outputs that are presented to output devices. With a touch screen display, an end user touches the touch screen at a user interface location to determine an input value. Typically, a touch screen display includes a touch controller interface with capacitive sensors of the display so that the location of touches is determined and provided to the operating system. The touch screen display is typically made of glass with thin layers of electrically conducting materials coated on the surface of the glass. These conductors are arranged in rows and columns. When a finger or a similarly charged object touches a top glass, the electrical field or capacitance below it changes. The change in the capacitance at a grid point, which is an intersection of a row and column, gives the location of the touch. Because of the low signal level implementation of the touch screen displays, it is sensitive to electromagnetic interference (also referred to herein as electromagnetic noise). The electromagnetic noise may disrupt or cause malfunction of an intended operation of a device, such as the touch screen. As such, uncontrolled electromagnetic noise is one of the root causes of unintended touch, also referred to herein as a ghost touch.

Ghost touch occurs when the touch screen display registers phantom interactions with the touch screen resulting in unwanted actions performed on the information handling system. The ghost touch may also result in the touch screen displaying unwanted visual displays resulting from the phantom interactions, such as phantom swipes, taps, holds, etc. One cause of the ghost touch is noise from an alternating current (AC) adapter (also referred to herein as an AC/direct current (AC/DC) adapter) used to power the information handling system or the touch screen. Power from the AC adapter may also be used to charge a battery of the information handling system when the information handling system is turned off. In addition, excess power from the AC adapter may be channeled to charge the battery. However, AC adapters may emit noise, such as electromagnetic or ground noise, that may affect capacitance at a grid point of the touch screen display, resulting in a ghost touch. Diminishing or eliminating noise may diminish ghost touches. To diminish or eliminate ghost touches in touch screen displays, the present disclosure provides a system and method to adaptively suppress or eliminate noise emitted by AC adapters.

Figure 2:
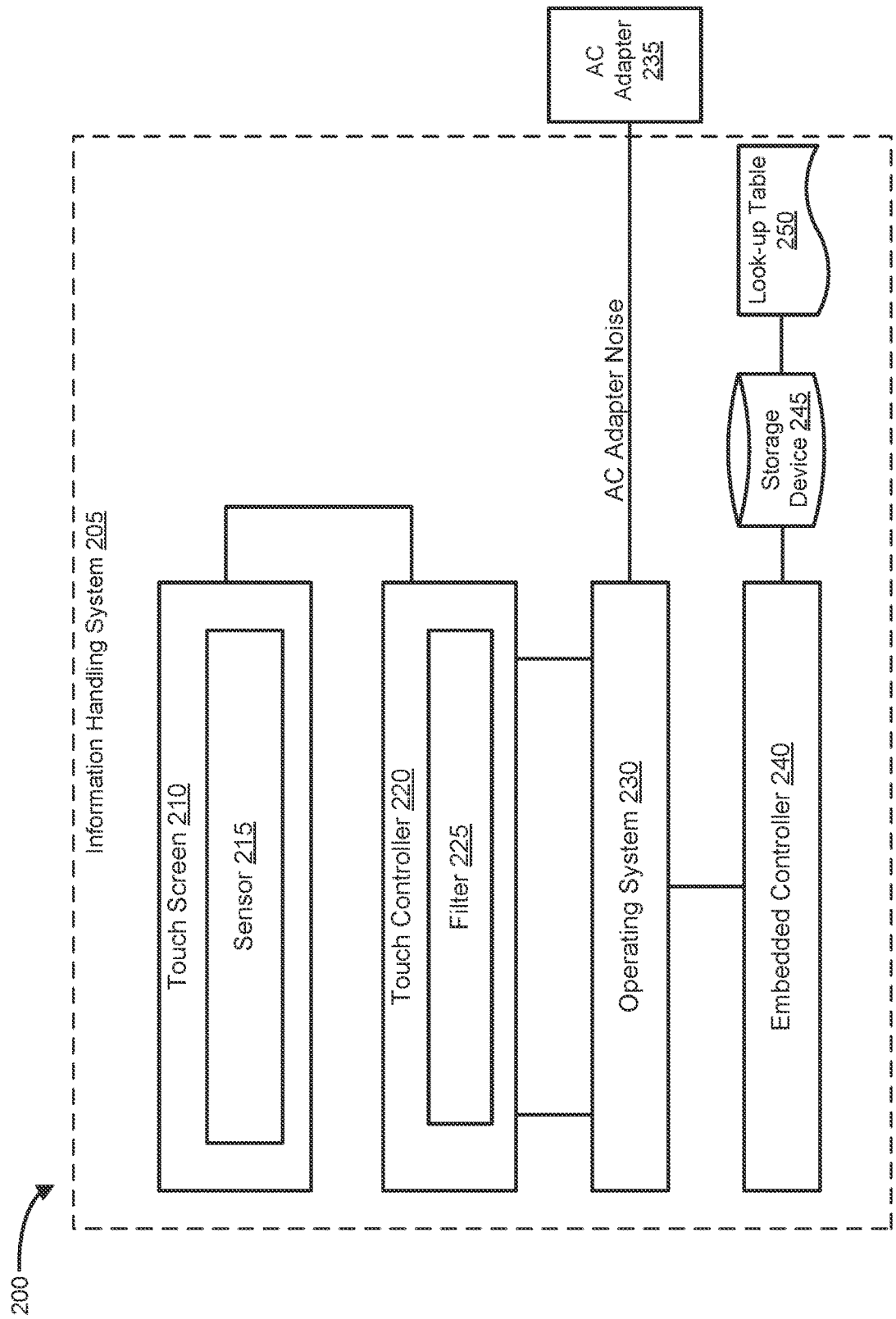
FIG. 2 is a block diagram illustrating a system for adaptive noise suppression for touch screen displays, according to an embodiment of the present disclosure.

FIG. 2 shows a system 200 for adaptive noise suppression for touch screen displays. System 200 includes an information handling system 205, which is similar to information handling system 100 of FIG. 1, coupled to an AC adapter 235. Information handling system 205, may be a portable information handling system that includes a touch screen 210, a touch controller 220, an operating system 230, an embedded controller 240, and a storage device 245. Touch screen 210 includes a sensor 215. Touch controller 220 includes a filter 225. Touch screen 210 may be coupled to touch controller 220 which may be coupled to operating system 230. Operating system 230 may be coupled to embedded controller 240.

In various embodiments, information handling system 205 may not include each of the components shown in FIG. 2. Additionally, or alternatively, information handling system 205 may include various additional components in addition to those that are shown in FIG. 2. Furthermore, some components that are represented as separate components in FIG. 2 may in certain embodiments instead are integrated with other components. For example, in certain embodiments, all or a portion of the functionality provided by the illustrated components may instead be provided by components integrated into one or more processor(s) as a system-on-a-chip.

Touch screen 210, also referred to as a touch screen display, may include a touch panel and a display device that allows a user to interact with what is displayed directly. For example, the user may provide input using a stylus, a pen, or a finger. Touch screen 210 may be a liquid crystal display, an active-matrix organic light-emitting diode, an organic light-emitting diode, or similar. The functions and features of a touch screen are known in the art and will not be further disclosed herein, except as needed to illustrate the various embodiments disclosed herein.

Sensor 215 may be embedded in touch screen 210 to receive touch responses. Sensor 215 may include transmit (Tx) and receive (Rx) transducers and/or transceivers. For example, Tx/Rx transceivers may include electromagnetic and acoustic transport mechanisms configured to send and receive communications to and from touch screen 210.

AC adapter 235 may receive AC electrical power, such as through a plug-in power cord that is configured to be plugged into a power outlet and convert this AC power to DC power. For example, AC adapter 235 may receive 100-240 volts of AC electrical power at 50-60 hertz and convert that to approximately 19.5 volts DC. However, it is understood that different types of AC adapters may receive different values of AC electrical power and may also output different values of DC power. Also, each type of AC adapter may have particular noise characteristics. As such, different filter parameters and/or parameter values may be used for to filter or attenuate noise for each AC adapter type. AC adapter 235 may be a power supply identification (PSID) power adapter capable of communicating with operating system 230 to inform information handling system 205 of its identification attributes. For example, AC adapter 235 may inform operating system 230 of its power rating, manufacturer, specifications, or other attributes.

Embedded controller 240, which is similar to BMC 190 of FIG. 1, may be configured to identify AC adapter 235 on initial insertion of AC adapter 235 into information handling system 205. After identifying AC adapter 235, embedded controller 240 may query lookup table 250 stored at storage device 245 for the filter settings that are optimal for AC adapter 235. Embedded controller 240 may then send the retrieved filter settings to touch controller 220. Touch controller 220 may apply the filter settings to generate a filter response by filter 225 for optimal noise suppression. For example, filter 225 may use the filter settings to attenuate the noise generated by AC adapter 235 to acceptable levels.

Lookup table 250 may include a number of entries associated with a mapping of AC adapter identifiers to a filter setting. For example, each type of AC adapter may be mapped to a filter setting, wherein each filter setting may include a set of filter parameters and/or parameter values, such as the touch controller's analog frontend (AFE) frequency and digital filter integration time, among others. Each of these filter settings may have been determined as optimal filter settings for an AC adapter type. For example, the filter setting for a particular AC adapter type may include the AFE frequency set to 5.5 MHz and the digital filter integration time to 5.27 µs. The filter setting for a different AC adapter type may include the AFE frequency set to 4.8 MHz and the digital filter integration time to 4.9 µs. The values associated with the parameters of the filter settings may be defined for a specific AC adapter type. The type of AC adapter may include a model, manufacturer, and/or category of the AC adapter. If an additional AC adapter type is supported, a lookup table 250 may be updated, such as via a firmware update. Lookup table 250 may be stored in a non-volatile storage device such as storage device 245. Storage device 245 may be a persistent data storage device, such as an NV-RAM, a solid state disk, a hard disk drive, and/or any computer-readable medium operable to store data.

Touch controller 220 may be interfaced with sensor 215 so that the location of the touches is determined and provided to operating system 230. Touch controller 220 may execute embedded code on a microcontroller so that capacitive values sensed at touch screen 210 are constantly scanned and monitored to determine touch inputs. Operating system 230 may be configured to sort through touches reported from touch controller 220 to determine the significance of the touches to operating system 230 and application user interfaces. Further, touch controller 220 may have an embedded filter 225.

Filter 225 may be a band-stop filter, or a band-rejection filter configured to attenuate noise generated by AC adapter 235. In particular, filter 225 may be a notch filter. Filter 225 may be configured to filter a peak or a notch at a certain frequency. Filter 225 may also be configured to retain or eliminate a frequency component of a signal. Parameters used by filter 225 may include the frequency at which the peak or notch is desired. For example, the parameters may include the touch controller's AFE frequency and digital filter integration time. The touch controller's frequency may be in megahertz (MHz) while digital filter integration time may be in microseconds (µs).

Those of ordinary skill in the art will appreciate that the configuration, hardware, and/or software components of information handling system 205 depicted in FIG. 2 may vary. For example, the illustrative components within information handling system 205 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for the continuity of the description.

Figure 3:
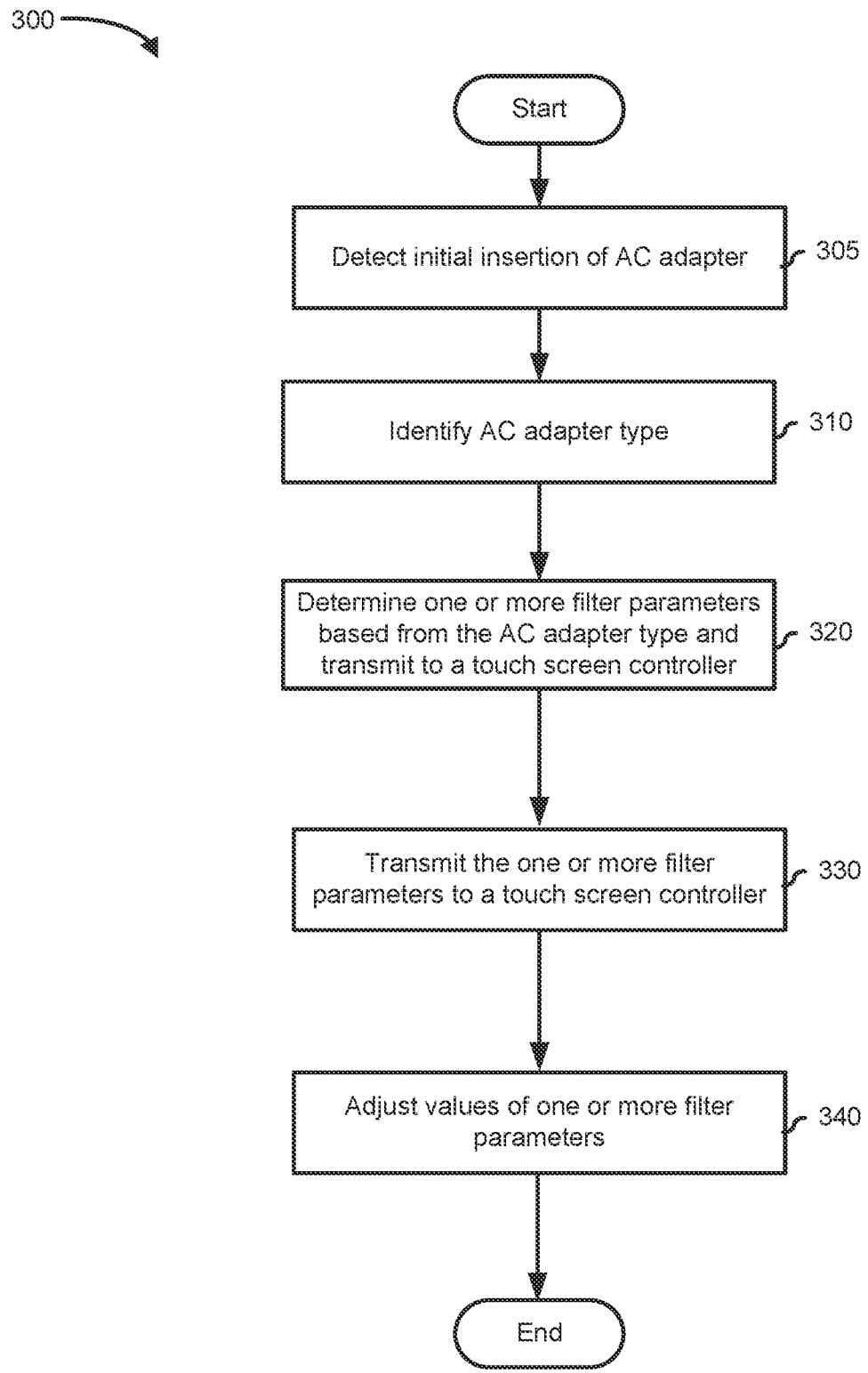
FIG. 3 is a flowchart illustrating a method for adaptive noise suppression for touch screen displays, according to an embodiment of the present disclosure.

FIG. 3 shows a flowchart of a method 300 for adaptive noise suppression for touch screen displays. Method 300 may be performed by one or more components of system 200 of FIG. 2. However, while embodiments of the present disclosure are described in terms of system 200 of FIG. 2, it should be recognized that other systems may be utilized to perform the described method. One of skill in the art will appreciate that this flowchart explains a typical example, which can be extended to advanced applications or services in practice.

Method 300 typically starts at block 305, where the method detects an initial insertion of an AC adapter. For example, this may be the first time that the information is being powered using this particular AC adapter. The method may be performed each time a new AC adapter is used. The method proceeds to block 310 where the method identifies the AC adapter type. The method may identify the AC adapter using various methods. An information handling system may be supplied DC power by an AC adapter that converts AC voltage to DC voltage that is usable by the information handling system. A power cable running between the AC adapter and the information handling system typically includes a number of conductors, for example, power conductors and an information conductor. An example of such an information conductor or information line is a PSID line. The PSID line provides the information handling system with information regarding the attributes of the particular AC adapter coupled to the information handling system. For example, the PSID line may provide information such as the name of the manufacturer and the wattage of the particular AC adapter.

At block 320, the method, or in particular the embedded controller, may determine filter parameters and associated values based on the information related with the AC adapter from the PSID line. The filter parameters, such as AFE frequency and digital filter integration time, may be determined using a look-up table stored in a storage device.

At block 330, after determining the filter parameters, the embedded controller may transmit the filter parameters to the touch controller. At block 340, the method, or in particular, the touch screen controller may adjust one or more filter parameters, such as AFE frequency and the digital filter integration time, based on the values determined previously.

Although FIG. 3 shows example blocks of method 300 in some implementations, method 300 may include additional blocks, fewer blocks, different blocks, or differently arranged blocks than those depicted in FIG. 3. Those skilled in the art will understand that the principles presented herein may be implemented in any suitably arranged processing system. Additionally, or alternatively, two or more of the blocks of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   detecting, by a processor, an initial insertion of an alternating current (AC) adapter;
   determining an identifier associated with the AC adapter;
   determining a parameter for filtering noise generated by the AC adapter based on the identifier; and
   filtering the noise generated by the AC adapter by applying the parameter, wherein the filtering of the noise generated by the AC adapter includes adjusting a touch controller's analog front end frequency and digital filter integration time.

2. The method of claim 1, wherein the determining of the parameter is performed by querying a lookup table stored in a non-volatile storage device.

3. The method of claim 2, wherein the querying of the lookup table is performed by an embedded controller.

4. The method of claim 2, wherein the lookup table includes a mapping of the parameter and a parameter value to the identifier associated with the AC adapter.

5. The method of claim 1, wherein the determining of the parameter includes determining a value associated with the parameter.

6. The method of claim 1, further comprising transmitting the parameter to a touch controller.

7. The method of claim 1, wherein the determining of the parameter for attenuating the noise is performed using a lookup table.

8. The method of claim 1, wherein the filtering of the noise generated by the AC adapter is performed by a notch filter embedded in a touch controller.

9. An information handling system, comprising:
a processor; and
a memory storing instructions that when executed cause the processor to perform operations comprising:
detecting an initial insertion of an alternating current (AC) adapter;
determining an identifier associated with the AC adapter;
determining a parameter for attenuating noise generated by the AC adapter based on the identifier; and
attenuating the noise generated by the AC adapter by applying the parameter, wherein the attenuating of the noise generated by the AC adapter is performed by a notch filter embedded in a touch controller.

10. The information handling system of claim 9, wherein the determining of the parameter for attenuating the noise is performed using a lookup table.

11. The information handling system of claim 9, wherein the determining of the parameter includes determining one or more values associated with the parameter.

12. The information handling system of claim 10, wherein the lookup table includes a mapping of the parameter to the identifier.

13. The information handling system of claim 9, further comprising transmitting the parameter to the touch controller.

14. The information handling system of claim 9, wherein the attenuating of the noise generated by the AC adapter includes adjusting a touch controller's analog front end frequency and digital filter integration time.

15. The information handling system of claim 9, wherein the determining of the parameter is performed by querying a lookup table stored in a non-volatile storage device.

16. A non-transitory computer-readable medium to store instructions that are executable to perform operations comprising:
detecting an initial insertion of an alternating current (AC) adapter;
determining an identifier associated with the AC adapter;
determining a parameter for filtering noise generated by the AC adapter based on the identifier; and
filtering the noise generated by the AC adapter by applying the parameter, wherein the filtering of the noise generated by the AC adapter includes adjusting a touch controller's analog front end frequency and digital filter integration time.

17. The non-transitory computer-readable medium of claim 16, wherein the determining of the parameter for the filtering of the noise is performed by querying a lookup table.

18. The non-transitory computer-readable medium of claim 17, wherein the lookup table includes a mapping of the parameter to the identifier.

19. The non-transitory computer-readable medium of claim 16, the operations further comprising transmitting the parameter to a touch controller.

20. The non-transitory computer-readable medium of claim 16, wherein the filtering of the noise generated by the AC adapter is performed by a notch filter embedded in a touch controller.

* * * * *